United States Patent [19]

Shimizu et al.

[11] Patent Number: 5,122,414
[45] Date of Patent: Jun. 16, 1992

[54] MAGNETIC RECORDING MEDIUM AND METHOD FOR MAKING

[75] Inventors: Yutaka Shimizu, Saku; Eizo Tsunoda, Komoro, both of Japan

[73] Assignee: TDK Corporation, Tokyo, Japan

[21] Appl. No.: 633,781

[22] Filed: Dec. 26, 1990

[30] Foreign Application Priority Data

Dec. 29, 1989 [JP] Japan .................. 1-342988

[51] Int. Cl.⁵ ............................................. G11B 23/00
[52] U.S. Cl. ...................................... 428/323; 427/48; 427/130; 428/329; 428/336; 428/694; 428/900
[58] Field of Search ............... 428/694, 900, 329, 323, 428/336; 427/130, 48

[56] References Cited

U.S. PATENT DOCUMENTS

| 4,518,626 | 5/1985 | Kato et al. ........................... 427/48 |
| 4,678,682 | 7/1987 | Asai et al. .......................... 427/130 |
| 4,743,500 | 5/1988 | Miyoshi et al. ..................... 428/900 |
| 4,745,001 | 5/1988 | Miyoshi et al. ..................... 427/48 |
| 4,861,619 | 8/1989 | Satake ................................ 427/130 |
| 4,917,947 | 4/1990 | Kosha et al. ....................... 428/900 |
| 4,965,125 | 10/1990 | Masaki et al. ..................... 428/900 |

FOREIGN PATENT DOCUMENTS 54-14482  6/1979  Japan .
61-57036  3/1986  Japan .

*Primary Examiner*—Paul J. Thibodeau
*Attorney, Agent, or Firm*—Oblon, Spivak, McClelland, Maier & Neustadt

[57] ABSTRACT

In a magnetic recording medium comprising a magnetic layer containing a magnetic powder, 5 to 20% by weight based on the weight of the magnetic powder of a non-magnetic abrasive having a Mohs hardness of at least 6, and a binder on a non-magnetic substrate, the magnetic layer becomes more durable while maintaining electromagnetic properties by distributing the abrasive in the magnetic layer such that its concentration is highest in a surface-adjoining portion and continuously decreases therefrom toward the substrate side. The medium is prepared by applying a magnetic coating to a substrate and continuously passing the coated substrate through reversing magnetic fields prior to curing of the coating.

7 Claims, 1 Drawing Sheet

MAGNETIC RECORDING MEDIUM AND METHOD FOR MAKING

This invention relates to a magnetic recording medium and a method for preparing the same.

BACKGROUND OF THE INVENTION

Magnetic recording media are generally manufactured by forming magnetic layers on non-magnetic substrates. The magnetic layers contain magnetic powder in binders, to which various additives such as antistatic agents, lubricants, abrasives, dispersants, and stabilizers are added to provide a good profile of electromagnetic properties, durability, and reliability.

In recent years, the requirement of high density recording is imposed on magnetic recording media in accordance with the size reduction of the equipment.

One approach for increasing the recording density of magnetic recording media is to furnish magnetic powder having a higher coercive force, higher saturation magnetic flux density or smaller particle size. Also attempts have been made for achieving a higher packing density and a higher degree of orientation of magnetic powder as well as smoothing the surface and reducing the layer thickness. These attempts for higher recording density, however, have arisen many problems including losses of reliability and durability, causing magnetic head clogging, frequent occurrence of dropouts and deterioration of still performance.

It is known that reliability and durability can be improved through a proper choice of the type and amount of abrasive. Japanese Patent Application Kokai No. 57036/1986, for example, proposes to control the population or density of abrasive to at least 0.25 particles/$\mu m^2$ on the magnetic layer surface. In the case of magnetic layers which are reduced to a thickness of about 4 $\mu$m or less for high density recording purposes, an increase of the density of abrasive by an ordinary distribution technique can lead to a loss of electromagnetic properties such as sensitivity and C/N and an increased abrasion of the associated magnetic head despite improved reliability and durability.

In turn, Japanese Patent Publication No. 14482/1979 proposes a magnetic layer of double layer structure for preventing magnetic head clogging and improving electro-magnetic properties. However, the magnetic layer contemplated therein is relatively thick as understood from the example in which two magnetic layers of 6 $\mu$m and 4 $\mu$m are stacked to form a composite magnetic layer of 10 $\mu$m thick. That is, thin magnetic layers, say about 4 $\mu$m or less, required for high density and long term recording are not borne in mind. This is partially because such extremely thin layers can be stacked with difficulty or at the sacrifice of productivity. Even if the upper layer to be stacked can be as thin as about 0.6 $\mu$m, the abrasive is distributed uniformly in a thickness direction of the upper layer and at a relatively high density. In addition, such a thin upper layer cannot be effectively worked as by calendering. Consequently, electromagnetic properties are adversely affected and productivity is lost due to the complex manufacturing process.

As discussed above, high density recording media must meet ambivalent requirements of electromagnetic properties and reliability and durability. The prior art techniques for abrasive addition are difficult to find a compromise therebetween.

SUMMARY OF THE INVENTION

Therefore, an object of the present is to provide a magnetic recording medium adapted for high density recording having a single magnetic layer and exhibiting high reliability and durability as well as improved electro-magnetic properties. Another object is to provide a method for preparing the medium.

The present invention which achieves these and other objects provides a magnetic recording medium comprising a non-magnetic substrate and a magnetic layer thereon containing a magnetic powder, 5 to 20% by weight based on the weight of the magnetic powder of a non-magnetic abrasive having a Mohs hardness of at least 6, and a binder. The magnetic layer has a surface remote from the substrate. The abrasive is distributed in the magnetic layer such that the concentration of the abrasive is highest in a surface-adjoining portion and continuously decreases therefrom toward the substrate side.

Typically, the magnetic layer has a thickness of up to 4 $\mu$m. The ratio of the concentration p1 of the abrasive in the surface-adjoining portion extending from the surface to a depth of 0.6 $\mu$m to the concentration p2 of the abrasive in the remaining portion of the magnetic layer, p1/p2, is at least 1.5. The non-magnetic abrasive has a mean particle diameter of up to 0.6 $\mu$m.

According to another aspect of the present invention, there is provided a method for preparing a magnetic recording medium comprising the steps of:

applying a magnetic coating composition containing a magnetic powder, 5 to 20% by weight based on the weight of the magnetic powder of a non-magnetic abrasive having a Mohs hardness of at least 6, and a binder to a non-magnetic substrate, and applying an external magnetic field in which the direction of magnetic line of force is successively reversed to the coated substrate, thereby forming a magnetic recording medium having a magnetic layer in which said non-magnetic abrasive is distributed at a higher concentration in a portion of the magnetic layer adjoining the outside surface thereof than in the remaining portion.

Preferably, the external magnetic field is created by a plurality of unit magnets arranged on the side of the substrate remote from the coated surface such that the polarity of one unit magnet is opposite to the polarity of adjoining unit magnets.

Typically, the coated substrate is continuously passed through the reversing external magnetic fields. Orientation is carried out after the step of applying an external magnetic field to the coated substrate.

The magnetic recording medium according to the present invention includes a single thin magnetic layer in which the total content of abrasive is reduced by causing some part of the abrasive to shift upward or locally concentrate in the surface-adjoining portion of the magnetic layer while reducing the content of abrasive from the surface-adjoining portion toward the substrate side. The local concentration of abrasive near the surface ensures high reliability and durability while maintaining the excellent electromagnetic properties of the thin magnetic layer for high density recording.

Prior to orientation of magnetic powder, the magnetic coating is moved through the reversing magnetic fields whereby the magnetic powder is drawn toward the substrate so that relatively much abrasive is distributed on the surface side. The passage through the reversing magnetic fields assists in debubbling from the coating and orientation, contributing to improvements in electromagnetic properties.

BRIEF DESCRIPTION OF THE DRAWINGS

The above and other objects, features, and advantages of the present invention will be better understood from the following description taken in conjunction with the accompanying drawings, in which:

The Figure is a schematic side view showing the manufacture of a magnetic recording medium according to the present invention.

DESCRIPTION OF THE PREFERRED EMBODIMENT

Figure 1:
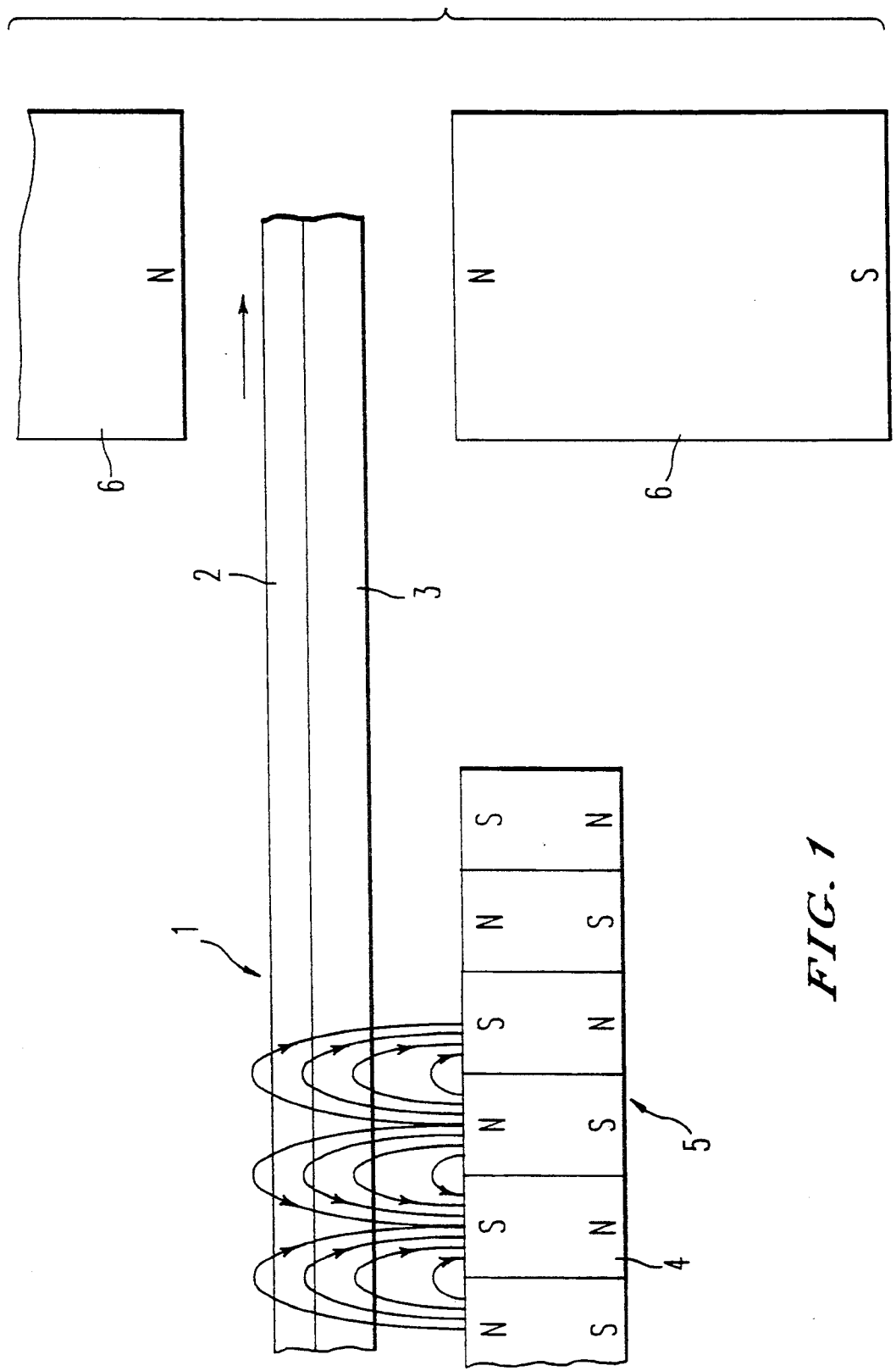

The magnetic recording medium of the present invention includes a magnetic layer on a non-magnetic substrate having a magnetic powder and an abrasive dispersed in a binder.

The magnetic powder used herein may be selected from magnetic powders commonly used in conventional magnetic recording media, for example, iron oxide particles such as $\gamma$-$Fe_2O_3$, Co-doped iron oxide particles such as Co-doped $\gamma$-$Fe_2O_3$, magnetic metal particles, barium ferrite particles and $CrO_2$. A proper type of magnetic powder may be selected for a particular purpose while its coercive force, remanence, specific surface area and other factors may vary to meet the purpose.

In the case of video tape and other magnetic recording media adapted for high density recording, magnetic metal particles having a coercive force of at least 1,300 oersted (Oe), especially 1,300 to 3,000 Oe are preferred.

Where magnetic metal particles are used as ferromagnetic powder, those particles having an oxide coating on the surface may be used and one or more types of metal particles used.

The ferromagnetic powder used herein is generally in needle and particulate forms, between which a choice may be made in accordance with the intended application of magnetic recording medium. For use as video tape, needles are preferred, especially having an average aspect ratio l/d of about 3 to about 20 wherein l is an average length in the range of 0.1 to 0.5 $\mu$m and d is an average breadth. Also for such use, a specific surface area of 20 to 70 $m^2/g$ as measured by the BET method is preferred.

The binder used herein may be selected from binders commonly used in conventional magnetic recording media, for example, thermoplastic binders, thermosetting binders, and electron beam curable binders. Preferably, 0.1 to 0.3 parts by weight of the binder is used per part by weight of the magnetic powder.

The abrasive used herein is a non-magnetic abrasive having a Mohs hardness of at least 6. Examples of the abrasive include alumina $Al_2O_3$, non-magnetic chromium oxide $Cr_2O_3$, silicon carbide SiC, titanium oxide $TiO_2$, silica $SiO_2$, zirconia $ZrO_2$, and mixtures thereof. Among these, at least one abrasive selected from $Al_2O_3$, $Cr_2O_3$, and SiC is preferred from the standpoints of the dispersion of abrasive and head abrasion.

The abrasive preferably has a mean particle diameter of up to 0.6 $\mu$m, more preferably from 0.1 to 0.4 $\mu$m. Electromagnetic properties are sometimes poor in excess of 0.6 $\mu$m whereas extremely fine abrasive particles are ineffective for durability improvement. The abrasive may have spherical, angular or other particulate form. The particle diameter is usually determined by taking an image of particles under a transmission electron microscope (TEM) and calculating the diameter from the projected areas of particles on the assumption that the particles are circular.

The abrasive is present in the magnetic layer in a total amount of 5 to 20%, preferably 8 to 18% by weight based on the weight of the magnetic powder. On this basis, less than 5% by weight of abrasive is ineffective for durability and stability improvement whereas more than 20% by weight of abrasive adversely affects electromagnetic properties.

The abrasive is distributed in the magnetic layer of a single layer structure. The abrasive is locally concentrated in a portion of the layer adjoining the surface remote from the substrate, that is, a surface-adjoining portion. The concentration of the abrasive is highest in the surface-adjoining portion and lowest on the substrate side. In the lower portion of the magnetic layer between the surface-adjoining portion and the interface with the substrate, the abrasive concentration continuously varies or decreases from the surface-adjoining portion toward the substrate side. In this sense, the lower portion is referred to as a graded region.

The abrasive is preferably localized such that p1/p2 is at least 1.5, more preferably from 1.5 to 10, provided that p1 is the concentration of abrasive in the surface-adjoining portion of the magnetic layer extending from the surface to a depth of 0.6 $\mu$m and p2 is the concentration of abrasive in the remaining or lower portion of the magnetic layer. The benefits of the invention would be somewhat lost with a p1/p2 ratio of less than 1.5. Extreme localization as represented by a p1/p2 ratio in excess of 10 would rather detract from the reinforcement of the magnetic layer by the abrasive.

The concentration of the abrasive in the magnetic layer is determined by observing an image on a section of the magnetic layer under a transmission electron microscope (TEM), and calculating the percentage of the projected areas of abrasive particles per unit area. Preferably, the concentration of abrasive in the surface-adjoining portion p1 is 10 to 20% by area although it will somewhat vary with the total content of abrasive. Durability is often low with a p1 of less than 10% by area whereas electromagnetic properties will become low with a p1 in excess of 20% by area.

The concentration of the abrasive throughout the magnetic layer is generally 2 to 8% by area provided that the total content of the abrasive is 5 to 20% by weight based on the weight of the magnetic powder. This contrasts with the prior art uniform layer in which the abrasive is added in an amount of about 25% by weight based on the weight of the magnetic powder in order to form a magnetic layer having an abrasive concentration of 10% by area.

In the magnetic recording medium of the invention, the abrasive localized region having an abrasive concentration of 10 to 20% by area is normally 0.3 to 1.0 $\mu$m thick and adjoined on the substrate side by a graded or transition region where the abrasive concentration continuously decreases toward the substrate interface. Then better results are obtained.

The magnetic layer may further contain well-known additives such as antistatic agents, lubricants, dispersants, and film hardeners depending on the particular application of medium.

The magnetic layer preferably has a thickness of up to 4 $\mu$m, especially about 2.0 to about 4.0 $\mu$m. For the 8-mm video tape, the magnetic layer is about 2.5 to about 3.5 μm.

Preferably, the magnetic layer has a coercive force Hc of about 800 to 2,500 Oe, a residual magnetic flux density Br of about 1,500 to 3,000 G, and a squareness ratio of about 0.8 to 0.9. Further, the magnetic layer has a porosity of up to 7%, especially 2 to 7%. The porosity may be determined either by comparing the saturation magnetization $\sigma_s$ of magnetic powder with the residual magnetic flux density Br of medium or from a TEM image on a section of the magnetic layer.

Although the magnetic layer used in the invention is a single layer having the above-defined distribution of abrasive, an underlying magnetic layer may be provided between the magnetic layer and the substrate.

In general, the medium of the invention has such a magnetic layer on one surface of the non-magnetic substrate. A double side medium having a magnetic layer on either surface of the substrate is also contemplated herein and the application of an external magnetic field to be described later may be conducted upon formation of each magnetic layer.

As to the coating type magnetic layer, reference is made to Japanese Patent Application Kokai No. 38522/1987 by the same assignee as the present invention.

The non-magnetic substrate used in the magnetic recording medium of the invention is not particularly limited. A desired one for a particular purpose may be selected from a variety of known flexible materials and rigid materials and processed to desired shape and dimensions in accordance with the selected standard. Exemplary flexible materials are polyesters such as polyethylene terephthalate.

If desired, an underlying layer, either magnetic or non-magnetic, may be provided on the substrate while a backcoat layer may be provided on the surface of the substrate remote from the magnetic layer. The backcoat layers which can be used herein include well-known coating type backcoat layers containing conductive fillers and pigments and plasma-polymerized films.

Now, the manufacture of the magnetic recording medium according to the present invention is described.

The magnetic recording medium is manufactured by first blending a magnetic powder with 5 to 20%, preferably 8 to 18% by weight based on the weight of the magnetic powder of a non-magnetic abrasive having a Mohs hardness of at least 6 and a binder to form a magnetic coating composition. The composition is then applied to a non-magnetic substrate by a coating technique. Prior to drying of the coating, an external magnetic field in which the direction of magnetic line of force is successively reversed is applied to the coated substrate. The external magnetic field applying means used herein includes a plurality of magnetic field creating means which may be permanent magnets or electromagnets.

FIG. 1 illustrates one preferred example of the means for creating an external magnetic field. Most often, a magnetic strip 1 having a magnetic coating 2 on a substrate 3 is passed through an external magnetic field in which the direction of magnetic line of force is successively reversed. The means 5 for creating reversing magnetic fields includes a plurality of unit magnets 4 which are arranged on the side of the substrate 3 remote from the coated surface such that the polarity of one unit magnet is opposite to the polarity of adjoining unit magnets. The number of unit magnets 4 corresponds to the number of reversal of magnetic fields and is usually at least 4, preferably 8 to 25. Less than four unit magnets are often ineffective to provide the desired distribution profile of abrasive whereas too many reversing magnetic fields are unnecessary and sometimes result in a coating having a rough surface.

The unit magnets 4 may be either juxtaposed in close contact relationship as shown in the figure or spaced apart. It is advantageous to use unit magnets which are equal in magnetic field intensity and size. Any desired unit magnets may be used insofar as they create magnetic fields which are uniform in the transverse direction of the strip. They may be sized in accordance with the desired magnetic field reversal cycle to be described later. Preferably the unit magnets 4 have a maximum energy product (BH)max in the range of 3.5 to 37 MGOe.

The strip 1 is usually passed over the external magnetic field means 5 in the form of an alternate magnet arrangement at a spacing of about 3 to 20 mm. Then a magnetic field having an intensity of at least 300 G, more preferably 800 to 2,000 G can act on the magnetic coating 2. A better distribution profile of abrasive is accomplished with such a spacing or magnetic field intensity. Too high magnetic field intensity is unnecessary. The strip can be placed closer to the magnet arrangement, but without contact of the substrate 3 with the unit magnets 4.

Most often, the coated substrate 1 is continuously passed across the external magnetic field creating arrangement 5 as shown by an arrow in the figure whereby reversing external magnetic fields alternately act on the wet coating or magnetic layer 2. Alternatively, the unit magnet arrangement 5 may be moved relative to the coated substrate. As the coated substrate is passed through reversing magnetic fields, magnetic particles in the magnetic coating oscillate along the lines of magnetic flux whenever the direction of magnetic flux is reversed so that the magnetic particles are cyclically drawn toward the magnetic field creating arrangement 5. Consequently, the non-magnetic abrasive particles are moved outward and distributed at a relatively high concentration in the surface-adjoining portion of the magnetic coating 2. As a result of fluctuation, the magnetic particles undergo a kind of preliminary orientation leading to a higher degree of orientation and a higher squareness ratio. The fluctuation is also effective in removing bubbles, resulting in reduced porosity.

The number of reversing magnetic fields is represented by the number of unit magnets 4 for simplicity's sake and is therefore preferably at least 4, more preferably 8 to 25. The cycle of magnetic field reversal may be 50 to 400 cycles/sec. To this end, the coated strip 1 is continuously transferred in a longitudinal direction across the external magnetic field creating arrangement 5 with the substrate 3 faced toward the arrangement 5, whereby the magnetic field acting on the magnetic coating 2 is alternately reversed.

The magnetic fields act on the magnetic coating 2 from the back side of the substrate because the magnetic particles are fluctuated or drawn toward the substrate. If the magnetic fields act on the magnetic coating 2 from above, fluctuation of magnetic particles occurs near the coating surface, not inducing the outward movement of abrasive particles.

Therefore, it is sufficient and effective for the present purposes to place the magnetic field creating means 5 on only the back side of the substrate as shown in the figure although it is possible to place the magnetic field creating means 5 on both the coating and back sides of the substrate. In the latter case, the magnetic field acting from the back side should have higher intensity than the magnetic field acting from the coating side.

The strip 1 is then passed between an orienting pair of opposed magnets 6, 6 for achieving longitudinal orientation. The orienting magnets 6 are spaced from the alternating magnetic field creating means 5 such that they do not interfere with each other. The polarity of the orienting magnets 6 at the opposed ends (N in the figure) should preferably be opposite to the polarity of the last stage unit magnet 4 of the magnetic field creating means 5 (S in the figure) because smooth orientation is achievable. The magnetic field for orientation preferably has an intensity of 1,500 to 10,000 G in the magnetic layer or coating 2.

Thereafter, the coated strip is subjected to surface smoothing as by calendering and to curing.

The strip is finally cut to the predetermined size by means of a slitter or the like, obtaining standard magnetic tapes.

EXAMPLE

Examples of the present invention are given below by way of illustration and not by way of limitation.

EXAMPLE 1

A magnetic coating composition was prepared according to the following formulation.

| Ingredients | Parts by weight |
| --- | --- |
| Magnetic metal powder mean length 0.2 μm, aspect ratio 8, Hc: 1500 Oe, $\sigma_s$: 130 emu/g | 100 |
| Vinyl chloride-vinyl acetate-vinyl alcohol copolymer (VAGH by UCC) | 10 |
| Polyurethane resin (N-2304 by Nihon Polyurethane K.K.) | 10 |
| Low molecular weight polyisocyanate (Colonate L by Nihon Polyurethane K.K.) | 5 |
| Abrasive | 3–30 |
| Stearic acid | 0.2 |
| Lecithin | 0.5 |
| Toluene | 50 |
| Methyl ethyl ketone | 50 |
| Methyl isobutyl ketone | 50 |

The abrasive used herein was a mixture of $Cr_2O_3$ having a mean particle diameter of 0.25 μm and $Al_2O_3$ having a mean particle diameter of 0.20 μm in a weight ratio of 1:1. It was added in varying amounts of from 3 to 30 parts by weight.

The magnetic coating composition was coated on a polyester film of 10 μm thick, and then subjected to localization by reversing external magnetic fields, orientation, calendering, and thermosetting.

The localization was carried out by using an arrangement of unit magnets for creating reversing magnetic fields as shown in FIG. 1. The unit magnets each had a width of 20 mm in the transfer direction of the coated film and created an equal magnetic field at the surface.

The magnetic fields were reversed in the number shown in Table 1 by varying the number of unit magnets. The number of reversal of magnetic fields is represented by the number of unit magnets.

Further, the intensity of the magnetic field acting on the magnetic coating from the unit magnets was varied as shown in Table 1 by changing the spacing between the coated film and the magnet arrangement.

For orientation, a pair of opposed magnets were used which created an orienting magnetic field of 4000 G.

The magnetic layer had a final thickness of 3.0 μm.

The coated film was finally slit into magnetic tape samples 8 mm wide.

For each sample, using a TEM image on a section of the magnetic layer, p1 of a surface-adjoining portion of 0.6 μm deep from the surface and p2 of the remaining portion were determined. It is to be noted that p1 and p2 are percentages of the projected areas of abrasive particles in the unit cross sectional area.

In Sample Nos. 1 to 5, a region extending about 0.2 μm from the level of 0.2 μm deep from the surface had the reported value of p1 and the underlying region was a graded region where the concentration of abrasive continuously decreased toward the substrate side.

For comparison purposes, sample No. 13 of double layer structure was prepared by coating a lower layer on a film and then coating an upper layer thereon. The lower layer contained 12.5 parts by weight of the abrasive per 100 parts by weight of the magnetic powder and the upper layer contained 25 parts by weight of the abrasive per 100 parts by weight of the magnetic powder, with the remaining ingredients being the same as above. The lower and upper magnetic layers were 2.4 μm and 0.6 μm thick, respectively.

The squareness ratio, residual magnetic flux density Br, and porosity (%) of the samples are also shown in Table 1. The porosity was calculated from Br.

The samples were further measured for RF output at 5 MHz. The RF output was reported in dB relative to the output of sample No. 11.

Furthermore, the samples were evaluated for still performance and head clogging. The still performance was examined by operating the tape at room temperature (23° C.) and RH 65% and measuring an output drop after 2 hours. Evaluation was based on the following criterion.

| E: | | RF output drop < 1.0 dB |
| --- | --- | --- |
| G: | 1.0 dB ≦ | RF output drop < 2.0 dB |
| F: | 2.0 dB ≦ | RF output drop < 3.0 dB |
| P: | 3.0 dB < | RF output drop |

The head clogging was examined by feeding the tape a number of passes at 40° C. and RH 80%. Evaluation was based on the following criterion.
E: no clogging beyond 100 passes
G: 50 passes ≦ clogging < 100 passes
F: 20 passes ≦ clogging < 50 passes
P: clogging within 20 passes
The results are shown in Table 1.

TABLE 1

| Sample No. | Riversing magnetic field Intensity (G) | Reversal | Abrasive (pbw) | p1 (%) | p1/p2 | Squareness ratio | Br (G) | Porosity (%) | RF output (dB) | Still | clogging |
| --- | --- | --- | --- | --- | --- | --- | --- | --- | --- | --- | --- |
| 1 | 1000 | 10 | 15 | 10 | 1.6 | 0.84 | 2570 | 6.9 | +0.6 | ∘ E | ∘ E |
| 2 | 1000 | 15 | 15 | 13 | 2.5 | 0.84 | 2590 | 6.2 | +0.7 | ∘ | ∘ |
| 3 | 1500 | 20 | 10 | 11 | 3.4 | 0.85 | 2750 | 3.3 | +0.8 | ∘ | ∘ |

TABLE 1-continued

| Sample No. | Riversing magnetic field Intensity (G) | Reversal | Abrasive (pbw) | p1 (%) | p1/p2 | Squareness ratio | Br (G) | Porosity (%) | RF output (dB) | Still | clogging |
|---|---|---|---|---|---|---|---|---|---|---|---|
| 4 | 1500 | 20 | 15 | 14 | 2.7 | 0.84 | 2630 | 4.3 | +0.7 | ○ | ○ |
| 5 | 1500 | 20 | 20 | 20 | 3.3 | 0.84 | 2540 | 6.4 | +0.4 | ○ | ○ |
| 11* | — | — | 15 | 7 | 1.0 | 0.81 | 2340 | 14.3 | 0.0 | xP | xP |
| 12* | — | — | 25 | 10 | 1.0 | 0.80 | 2120 | 18.7 | −0.2 | ○ | ○ |
| 13* (double layer) | — | — | upper 25 lower 12.5 | 10 | 2.0 | 0.83 | 2400 | 8.3 | −0.2 | ○ | ○ |

*outside the scope of the invention

The effectiveness of the present invention is evident from Table 1. Comparative sample No. 13 having a thin upper layer was less smooth in calendering and therefore, had a rough surface, resulting in a lowering of RF output. In contrast, sample Nos. 1 to 5 within the scope of the invention showed improved electromagnetic properties and durability.

Equivalent results were obtained with magnetic tape samples which were prepared by replacing the ferromagnetic powder by another, and replacing the abrasive by $Al_2O_3$, $Cr_2O_3$ and SiC alone or mixtures thereof.

There has been described a magnetic recording medium comprising a magnetic layer in which the abrasive is locally distributed such that its concentration is highest near the surface and decreases toward the substrate side. The medium is satisfactorily reliable and durable while the electro-magnetic properties of the magnetic layer for high density recording are maintained.

The method of the invention is not only effective in localizing the abrasive, but also helps debubbling and orientation of the magnetic coating, contributing to a further improvement in electromagnetic properties.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims:

We claim:

1. A magnetic recording medium comprising a non-magnetic substrate and a single magnetic layer thereon containing a magnetic powder, 8 to 20% by weight based on the weight of the magnetic powder of a non-magnetic abrasive having a Mohs hardness of at least 6 and a mean particle diameter of 0.1 to 0.6 μm, and a binder, said magnetic layer having a surface remote from the substrate, wherein said abrasive is distributed in said magnetic layer such that the concentration of said abrasive is highest in a portion of the magnetic layer adjoining the surface and continuously aries from the surface-adjoining portion toward the substrate side, wherein said magnetic layer has a thickness of up to 4 μm, the ratio of the concentration p1 of said abrasive in the surface-adjoining portion of said magnetic layer extending from the surface to a depth of 0.6 μm to the concentration p2 of said abrasive in the remaining portion of said magnetic layer, p1/p2, is between 1.5 and 10, and the concentration p1 of said abrasive in the surface-adjoining portion is about 10 to 20% by area.

2. A method for preparing a magnetic recording medium comprising the steps of:
applying a magnetic coating composition containing a magnetic powder, 8 to 20% by weight based on the weight of the magnetic powder of a non-magnetic abrasive having a Mohs hardness of at least 6, and a mean particle diameter of 0.1 to 0.6 μm, and a binder to a non-magnetic substrate, and
applying an external magnetic field in which the direction of magnetic line of force is successively reversed to the coated substrate, thereby forming a magnetic recording medium having a magnetic layer in which said magnetic layer has a thickness of up to 4 μm and the ratio of the concentration p1 of said abrasive in the surface-adjoining portion of said magnetic layer extending from the surface to a depth of 0.6 μm to the concentration p2 of said abrasive in the remaining portion of said magnetic layer, p1/p2, is between 1.5 and 10, and the concentration p1 of said abrasive in the surface-adjoining portion is about 10 to 20% by area.

3. The method of claim 2 wherein the external magnetic field is created by a plurality of unit magnets arranged on the side of the substrate remote from the coated surface such that the polarity of one unit magnet is opposite to the polarity of adjoining unit magnets.

4. The method of claim 2 wherein the step of applying an external magnetic field to the coated substrate includes passing the coated substrate through a series of reversing magnetic fields.

5. The method of claim 2 or 4 which further includes, after the step of applying an external magnetic field to the coated substrate, the step of orienting the magnetic powder.

6. The method of claim 2 wherein the polarity of the last pole in the alternately reversing magnetic arrangement is opposite to the polarity of the orienting magnet.

7. The method of claim 2 wherein the arrangement of magnets comprises 8 to 25 magnets.

* * * * *